United States Patent [19]
BeVier et al.

[11] Patent Number: 4,627,456
[45] Date of Patent: Dec. 9, 1986

[54] VALVE SYSTEM FOR PARTICULATE SOLID FLOW CONTROL

[75] Inventors: William E. BeVier; Kenneth C. Kather, both of Kenmore; Lawrence S. Graczyk, Orchard Park, all of N.Y.

[73] Assignee: Union Carbide Corporation, Danbury, Conn.

[21] Appl. No.: 760,922

[22] Filed: Jul. 31, 1985

[51] Int. Cl.$^4$ .............................................. F16K 3/02
[52] U.S. Cl. ........................................ 137/1; 137/209; 137/572
[58] Field of Search ................... 222/559, 544, 545; 137/209, 1, 571, 572, 575, 570

[56] References Cited

U.S. PATENT DOCUMENTS

| | | | |
|---|---|---|---|
| 1,398,047 | 11/1921 | Stevens | 222/559 X |
| 1,612,283 | 12/1926 | Hackney | 222/559 X |
| 1,702,311 | 2/1929 | Pantenburg | . |
| 2,238,296 | 4/1941 | Stock | 222/559 X |
| 2,373,935 | 4/1945 | Winter | 137/209 |
| 2,596,817 | 5/1952 | McGovney | 251/51 |
| 2,684,729 | 7/1954 | Berg | 183/4.2 |
| 2,726,135 | 12/1955 | Davis, Jr. | 23/1 |
| 2,726,136 | 12/1955 | Davis, Jr. | 23/1 |
| 3,455,490 | 7/1969 | Jolley | 222/193 |
| 4,070,161 | 1/1978 | Harter | 48/210 |
| 4,201,287 | 5/1980 | Straub | 222/559 X |
| 4,292,992 | 10/1981 | Bhide | 137/340 |
| 4,356,838 | 11/1982 | Morello | 137/242 |

FOREIGN PATENT DOCUMENTS

| 988867 | 5/1951 | France | 222/459 |
|---|---|---|---|
| 15845 | 7/1912 | United Kingdom | 222/559 |

OTHER PUBLICATIONS

Dense Phase Gravity Load, *Cyclonaire Corp.*, Henderson, Neb., 1983.

Primary Examiner—Alan Cohan
Attorney, Agent, or Firm—Stanley Ktorides

[57] ABSTRACT

A valve system for particulate solid flow control which is especially advantageous where combined particulate solid and fluid flow control through a pressure level change is desired, such as might be used in conjunction with a lockhopper.

12 Claims, 4 Drawing Figures

VALVE SYSTEM FOR PARTICULATE SOLID FLOW CONTROL

TECHNICAL FIELD

This invention relates to flow control of particulate solid material and is particularly advantageous for use to control a mixture of particulate solid material and fluid material.

BACKGROUND OF THE INVENTION

Many industrial and other systems involve the handling and flow control of solid particulate matter. Some such systems involve dispensing of solid particulate material in a batch fashion and thereby involve the opening and closing of valves associated with storage bins or hoppers. Other systems involve processing solid particulates in an essentially continuous fashion. Such systems include catalytic reactor systems or separation processes. In some cases the solid particulates are handled as feedstocks for reactor systems as in the case of synthetic fuel plants that utilize particulate coal as the feedstock material. Other systems such as separation systems involve the handling of particulate solids in a recirculating manner as in the case of particulate adsorbents that are used to purify or separate gas streams.

A problem in the handling and flow control of solid particulate matter is abrasion caused by contact between the solid particulate matter and valve surfaces. This abrasion has two different detrimental effects. First, this abrasion causes excessive valve wear and, especially where valve mating surfaces are involved, causes the valve to fail to function properly. Second, abrasion leads to the crusting and attrition of the particulate solid matter which can cause detrimental excessive dust in the process as well as depletion of particle inventory. Such problems are particularly troublesome in a moving bed adsorption system. Another problem of particle abrasion is that such abrasion causes variations in particle size distribution and this has an undesirable effect on the operation of a fluidized bed system.

It is thus desirable to have a valve for controlling the flow of particulate solid material while enabling reduction in valve wear and in particle abrasion and breakdown.

Often particulate solid material is handled in conjunction with a fluid such as a gas or a liquid. In these situations the abrasion problem discussed above is even more detrimental. This is because although valve wear, which causes the valve to fail to close completely, may not be such as to allow leakage of the solid particulate matter, such valve wear would allow leakage of the fluid matter, necessitating repair or replacement of the valve. A further problem in such systems, which occurs when the valve employs mating surfaces, is the retention of some particulate matter between the mating surfaces. This further complicates the closure problem and allows even further fluid leakage past the valve.

There are systems which handle flow streams of solid particulate matter and a fluid wherein a change in the pressure level of the stream is an important aspect of the system. Such systems may employ lockhoppers and examples of such systems are the introduction of pulverized coal into a pressurized gasifier and the introduction of adsorbent from a low pressure regenerator to a high pressure adsorber for removal of an impurity or component from a gas stream. In these systems the abrasion problem is extremely acute because only very small amounts of wear which cause the valve to fail to achieve pressure-tight closure would be enough to render impossible the proper function of a pressure change system. In these pressurized systems, the problem of particulate retention between valve mating surfaces would render the valve essentially useless to produce a pressure-tight seal.

Accordingly it is an object of this invention to provide an improved valve and method for controlling the flow of particulate solid material while enabling reduction in valve wear and in particle abrasion and breakdown.

It is a further object of this invention to provide an improved valve system and method for controlling the flow of a mixture of particulate solid material and fluid material while enabling reduction in valve wear and in particle abrasion and breakdown to result in enhanced valve system integrity.

It is a still further object of this invention to provide a lockhopper having an improved valve system for controlling the flow of a mixture of particulate solid material and fluid material while enabling reduction in valve wear and in particle abrasion and breakdown to result in enhanced valve system integrity.

SUMMARY OF THE INVENTION

The above and other objects which will become apparent to one skilled in the art upon a reading of this disclosure are attained by this invention, one aspect of which is:

A valve for controlling the flow of particulate solid material without need for valve mating surfaces, enabling reduction in valve wear and in particle abrasion and breakdown, comprising an essentially vertically oriented conduit having a downward directed opening for flow of particulate solid material and a surface structure positionable beneath and vertically spaced from said conduit opening and essentially perpendicular to solid conduit, said surface structure having a surface which is greater than the conduit opening cross-section projectable thereon when so positioned.

Another aspect of this invention is:

A method for controlling the flow of particulate solid material comprising passing particulate solid material through an essentially vertically oriented conduit having a downward directed opening, positioning a surface structure beneath and vertically spaced from said conduit opening, and piling particulate solid material passing through the opening onto the surface structure in a roughly conical pile having an angle of repose sufficient to enable the pile to completely block the opening.

Yet another aspect of this invention is:

A valve arrangement for controlling the flow of a particulate solid material and fluid material enabling reduction in valve wear and in particle abrasion and breakdown comprising: an enclosure having an inlet conduit and an outlet conduit; said inlet conduit being essentially vertically oriented and having a downward directed opening for flow of particulate solid material and fluid material into the enclosure; a surface structure positionable within the enclosure beneath and vertically spaced from said conduit opening and essentially perpendicular to said conduit, having a surface which is greater than the conduit opening cross-section projectable thereon when so positioned; and said outlet conduit having a valve therein suitable for controlling the flow of fluid material.

A further aspect of this invention is:

A method for controlling the flow of particulate solid material and fluid material comprising: passing particulate solid material and fluid material into an enclosure through an essentially vertically oriented inlet conduit having a downward directed opening; positioning within the enclosure a surface structure beneath and vertically spaced from said inlet conduit opening; piling particulate solid material passing through the inlet opening onto the surface structure in a roughly conical pile having an angle of repose sufficient to enable the pile to completely block the inlet opening; passing particulate solid material out from the enclosure through an outlet conduit having a valve therein suitable for controlling the flow of fluid material; and closing the valve in the outlet conduit after the flow of particulate solid material through the valve has ceased.

A still further object of this invention is:

A lockhopper comprising a hopper bin having incoming and outgoing means said incoming and outgoing means each having a valve arrangement for controlling the flow of particulate solid material and fluid material enabling reduction in valve wear and in particle abrasion and breakdown said valve arrangement comprising: an enclosure having an inlet conduit and an outlet conduit; said inlet conduit being essentially vertically oriented and having a downward directed opening for flow of particulate solid material and fluid material into the enclosure; a surface structure positionable within the enclosure beneath and vertically spaced from said conduit opening and essentially perpendicular to said conduit, having a surface which is greater than the conduit opening cross-section projectable thereon when so positioned; and said outlet conduit having a valve therein suitable for controlling the flow of fluid material.

As used herein, the term "mating surfaces" means valve surfaces that interact with each other when the valve is closed to form a fluid tight seal.

As used herein, the term "angle of repose" means the acute angle which the surface of a roughly conical pile of particulate solid material resting on a surface makes with the covered surface.

As used herein, the term "fluid" means gas and/or liquid.

DETAILED DESCRIPTION

The valve system of this invention will be described in detail with reference to the drawings.

Figure 1:
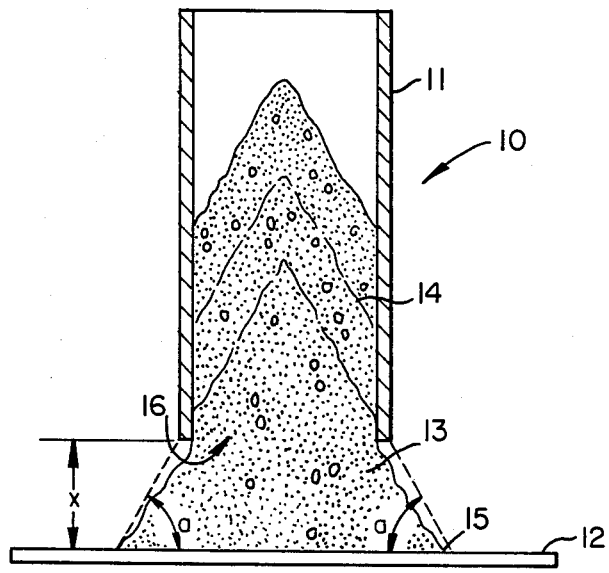
FIG. 1 is a simplified cross-sectional representation of the particulate solid flow control valve of this invention in the closed or non-flow position.
Figure 2:
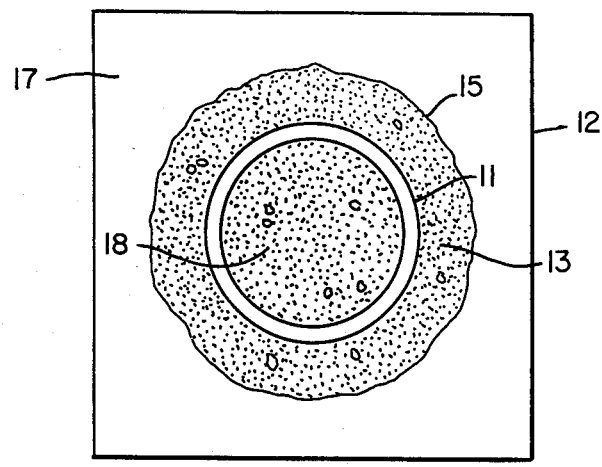
FIG. 2 is a simplified plan view of the valve shown in FIG. 1.

FIGS. 1 and 2 are side and top views respectively of a simplified representation of the particulate solid flow control valve of this invention. Referring now to FIGS. 1 and 2, valve 10 is comprised of essentially vertically oriented conduit 11 having downward directed opening 16. Conduit 11 need not be absolutely vertically oriented although this is the preferred orientation. Conduit 11 may be oriented at a small angle to the vertical. The drawings depict conduit 11 having a circular cross-section. This is the preferred embodiment. However, conduit 11 may have any effective cross-section such as a square or rectangular cross-section.

Valve 10 also comprises surface structure 12 which is positionable beneath and vertically spaced from conduit opening 16 and is oriented essentially perpendicular to conduit 11. Preferably surface structure 12 is oriented horizontally and thus will be perpendicular to conduit 11 when conduit 11 is vertically oriented. Surface structure 12 may be at a small angle from perpendicular to conduit 11 and/or at a small angle from horizontal. If conduit 11 and/or surface structure 12 are at a small angle, such angle should be small enough to allow particulate solid matter to form a roughly conical pile on surface structure 12 having an angle of repose sufficient to enable the pile to block opening 16. Generally this will mean that the surface can be tilted from the horizontal up to an angle that is less than the angle of repose of the solid particle material.

Surface structure 12 is preferably flat but this is not necessary and surface structure 12 may have an irregular or curved, as well as smooth surface, as long as the surface allows the formation of a roughly conical pile of particulate solid matter on surface structure 12 having an angle of repose sufficient to enable the pile to block opening 16.

It is necessary that surface structure 12 have a surface 17 which is greater than the cross-section 18 of conduit opening 16 which is projectable on surface 17 when surface structure 12 is positioned beneath conduit 11. If this were not the case when the requisite pile could not form. As a general rule, the area of surface 17 should exceed the area of projectable cross-section 18 by at least 10 percent and preferably by at least 25 percent.

Surface structure 12 is positionable vertically spaced from conduit opening 16 by a distance X which may be any effective distance which will allow the formation of a roughly conical pile of particulate solid matter on surface structure 12 having an angle of repose sufficient to enable the pile to block opening 16. It is preferred that distance X be at least several particle diameters as this will assist in minimizing abrasion and particle attrition. It should be noted that the required surface area for surface 12 is related to its position relative to conduit opening 16. For a given particulate solid, the necessary area will increase with the vertical distance between surface 12 and opening 16. It should also be noted that the shape of surface 12 does not need to be the same as that of conduit opening 16, although that is the preferred arrangement.

Surface structure 12 is positionable by any suitable means (not shown in FIGS. 1 and 2). Such means include, for example, a push-pull piston arrangement and a rotating support arrangement.

In operation, with surface structure 12 not positioned beneath conduit 11, particulate solid matter 14, such as coal particles, adsorbent particles, etc., flow through conduit 11 and down through opening 16. Although not shown in FIG. 1, it is understood that during operation valve 10 would be, directly or indirectly, in flow communication with a source of such particulate solid material. When one wishes to stop the flow of the particulate solid material, surface structure 12 is positioned beneath and vertically spaced from opening 16 and in an orientation to conduit 11 which will allow the formation of a roughly conical pile of particulate solid matter on surface structure 12 having an angle of repose sufficient to enable the pile to block opening 16. After surface structure 12 is so positioned, particulate solid matter 14 passing through opening 16 piles onto surface structure 12 and forms pile 13. Pile 13 has an angle of repose "a" which enables pile 13 to build up to a height so as to completely block opening 16. In this way the flow of particulate solid material is stopped without need for bringing valve surfaces, such as mating surfaces, in pressure contact with the particulate solid material thus enabling reduction in valve wear and in particle abrasion and breakdown. When one wishes to restart the flow of particulate solid material, one removes surface structure 12 from its defined position. Preferably, when flow of particulate solid material is desired through conduit 11, surface structure 12 is positioned so as to completely avoid contact with particulate solid material flowing down out of opening 16.

As can be seen from FIGS. 1 and 2, the edge or perimeter 15 of pile 13 will always exceed the perimeter of opening 16 because the angle of repose "a" will always be less than 90 degrees. The surface 17 must be such so as to completely accommodate pile perimeter 15. Pile perimeter 15 will increase, for any particular size and type of particle, as distance X increases. It is thus desirable to keep distance X relatively small while retaining a minimum distance of several average particle diameters. The size of pile perimeter 15 will also depend on the angle of repose "a" which itself is a function of particle factors such as the shape and size of the particular particles. Very smooth rounded particles would form a pile having a smaller angle of repose than that of a pile formed of relatively irregular particles. Further, the surface 17 can have some influence on the pile angle of repose. A very smooth surface would lead to the formation of a pile having a smaller angle of repose than that of a pile formed on a very rough surface. In general, the smaller the angle of repose of the pile 13, the greater, for any given distance X, will be the perimeter 15. The angle of repose for some common materials includes about 27 degrees for coal, about 25 degrees for beaded molecular sieve adsorbent, about 23 degrees for beaded carbon adorbent and about 37 degrees for powdered graphite. Thus, surface 17 must be sized accordingly depending on the distance X, the type of particulate matter being handled and the nature of surface 17. This sizing is an engineering determination within the capabilities of one skilled in the art.

Figure 3:
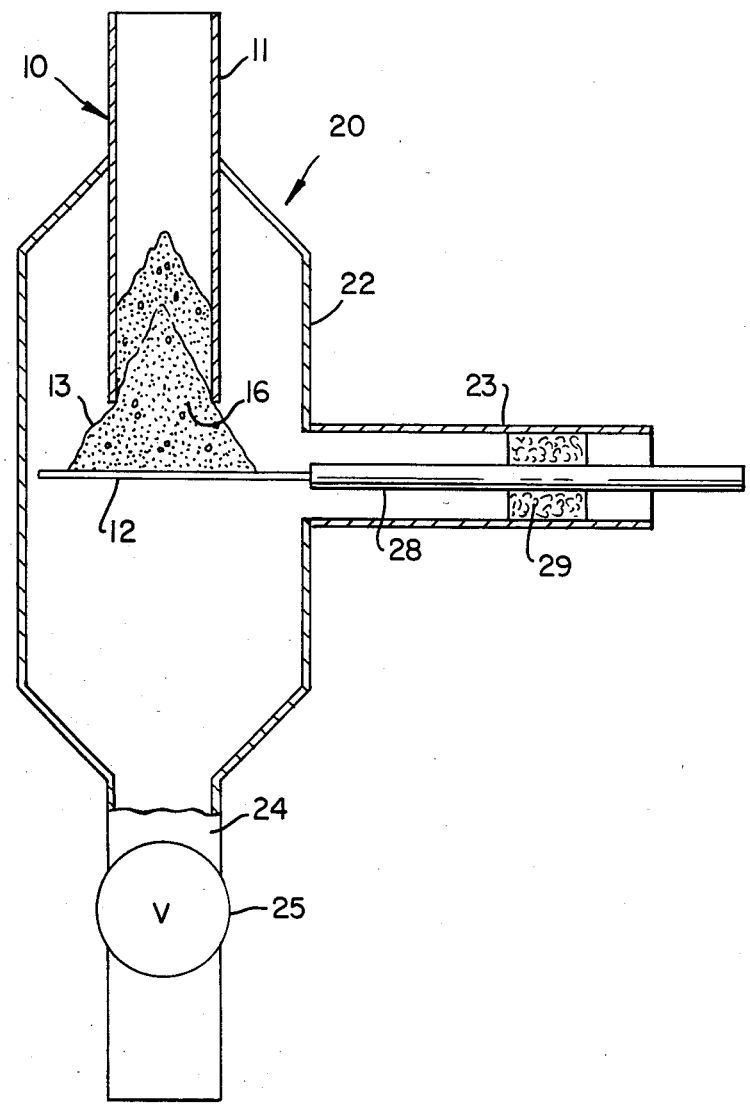
FIG. 3 is a cross-sectional view of a preferred embodiment of the valve arrangement of this invention.

When one wishes to control the flow of particulate solid material and also fluid material such as gaseous air, nitrogen etc. and/or liquid such as water, hydrocarbon, etc., one may advantageously employ the valve arrangement illustrated in FIG. 3. The numerals of FIG. 3 correspond to those of FIGS. 1 and 2 for the common elements.

Referring now to FIG. 3, valve arrangement 20 includes particulate solid flow control valve 10 and comprises enclosure 22 having inlet conduit 11 and outlet conduit 24. Enclosure 22 is intended to provide space for the solids valve in the conduit but is not intended to provide storage space for the particulate solids. Although it is preferable that enclosure 22 be completely enclosed, this is not strictly necessary in all situations and in some situations, such as when a gas is not used, it may be possible for enclosure 22 to be a partial enclosure. Inlet conduit 11 is essentially vertically oriented. Preferably conduit 11 is vertically oriented although it may be oriented at a small angle to the vertical. Preferably conduit 11 has a circular cross-section although any effective cross-section is acceptable. Conduit 11 has downward directed opening 16 through which would flow particulate solid material and fluid material into enclosure 22. Fluid material may also flow into enclosure 22 through means other than conduit 11.

Positionable within enclosure 22 beneath and vertically spaced from conduit opening 16 and essentially perpendicular to conduit 11 is surface structure 12. Preferably, surface structure 12 is oriented horizontally and thus will be perpendicular to conduit 11 when conduit 11 is vertically oriented. Surface structure 12 may be at a small angle from perpendicular to conduit 11 and/or at a small angle from the horizontal as was discussed earlier with reference to valve 10. The entire previous discussion of valve 10 is applicable herein to describe the use of valve 10 in valve arrangement 20.

FIG. 3 illustrates one arrangement which may be used to position surface structure 12. As shown in FIG. 3, surface structure 12 is connected to support rod 28 which is housed in side housing 23. Support rod 28 passes through appropriate packing 29 which serves to seal housing 23. Although not shown in FIG. 3, support rod 28 is then connected to any suitable means which can serve to move support rod 28 and thus position surface structure 12. Among such suitable movement means one can name a hydraulic piston or a gear and motor mechanism. Support rod 28 may also be manually operated in appropriate situations.

Outlet conduit 24 is located below inlet conduit 11 and contains valve 25 which may be any valve suitable for controlling the flow of fluid material. Examples of suitable types of valves which can be used to control fluid as valve 25 include gate valves, ball valves, globe valves, and butterfly valves.

The operation of valve arrangement 20 will now be described. With surface structure 12 not positioned beneath conduit 11 and with valve 25 open, particulate solid material and fluid material flow through conduit 11, down through opening 16 into enclosure 22, and out through outlet 24 and valve 25. When one wishes to stop the flow of the particulate solid material and the fluid material, surface structure 12 is positioned within enclosure 22 beneath and vertically spaced from conduit opening 16 and in an orientation to conduit 11 which will allow the formation of a roughly conical pile 13 of particulate solid material on surface structure 12 having an angle of repose sufficient to enable the pile to block opening 16. After surface structure 12 is so positioned, particulate solid material passing through opening 16 piles onto surface structure 12 and forms pile 13. Particulate solid material which had previously passed into enclosure 22, as well as fluid material, continues to pass through outlet 24 and valve 25. When substantially all of this previously passed particulate solid material has passed through valve 25 or when flow of particulate solid material through valve 25 has ceased, valve 25 is closed thus shutting off fluid flow through valve arrangement 20. In this way the flow of particulate solid material is stopped without need for bringing valve surfaces, such as mating surfaces, in pressure contact with the particulate solid material, thus enabling reduction in valve wear and in particle abrasion and breakdown. Furthermore, if valve 25 is a pressure-tight type of valve, the volume below valve 25 is sealed from the volume above valve 25 including enclosure 22. Since the flow of particulate solid material has been stopped by the closing of valve 10, and the flow of particulate solid material through valve 25 has ceased, there is no particulate solid material within valve 25 to interfere with the operational integrity of valve 25. This ensures a pressure-tight seal, if one is desired, and this arrangement is particularly advantageous if one wishes to pass the particulate solid material and the fluid material through a change in pressure level.

When one wishes to restart the flow of particulate solid material and fluid material, one first opens valve 25 and thereafter one removes surface structure 12 from its defined position, thus allowing flow of particulate solid material and fluid material through valve 10 into enclosure 22 and out of enclosure 22 through outlet 24.

As can be appreciated, FIGS. 1 and 3 depict respectively valve 10 and valve arrangement 20 in the closed position.

One situation wherein a pressure level change is employed is where a lockhopper is used. Lockhoppers are vessels that are used to introduce solids through a change in pressure level. For example, lockhoppers can be used to introduce pulverized coal into a pressurized gasifier. Likewise, lockhoppers can be used to introduce adsorbent from a low pressure regulator to a high pressure absorber for removal of an impurity or component from a gas stream. Lockhoppers are essentially batch operations that are necessary to allow a change of pressure level in a process arrangement that would otherwise be preferably continuous. A lockhopper employing the valve arrangement of this invention is illustrated in FIG. 4 wherein the numerals correspond to those of FIGS. 1-3 for the common elements.

Figure 4:
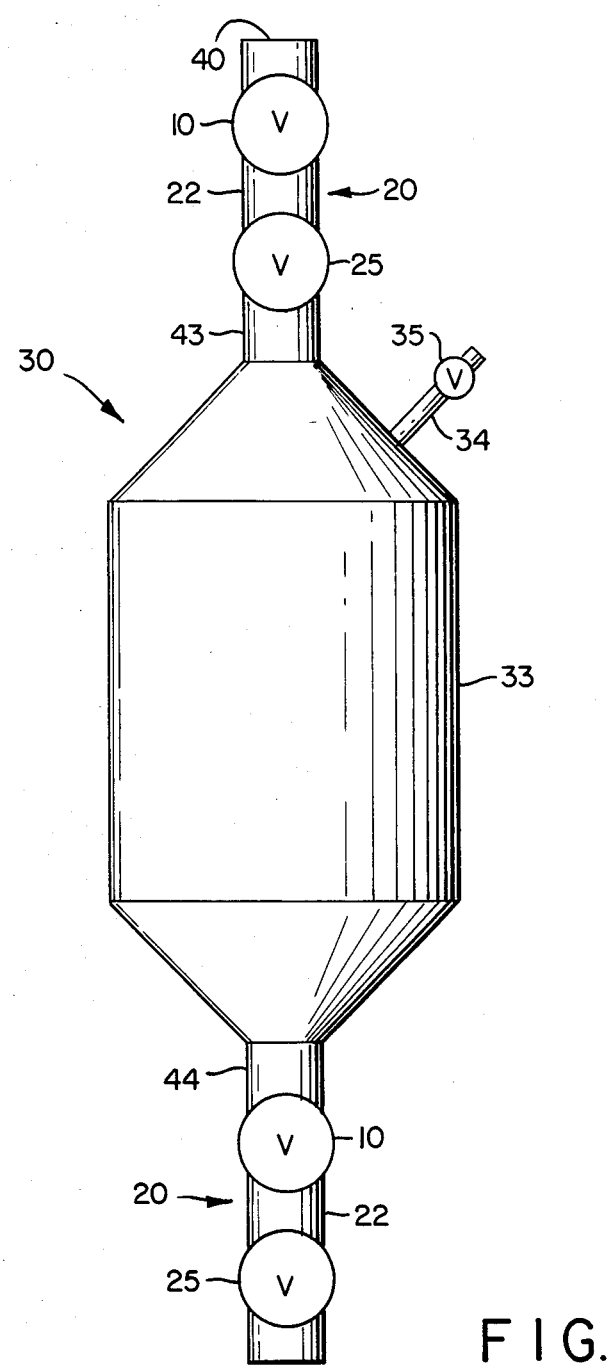
FIG. 4 is a simplified side elevation representation of one embodiment of the lockhopper of this invention.

Referring now to FIG. 4, lockhopper 30 comprises hopper bin 33 having incoming means 43 and outgoing means 44. Incoming means 43 and outgoing means 44 are preferably conduits but can be any effective means for passage of solid particulate material and fluid material respectively into and out from hopper bin 33. Each of incoming means 43 and outgoing means 44 contains a valve arrangement 20 which is constructed and which operates in accord with the description previously put forth. In particular, each valve arrangement 20 is comprised of particulate solid flow control valve 10, enclosure 22 and fluid flow control valve 25. For the sake of simplicity, the particulate solid flow control valves 10 of FIG. 4 as well as the fluid flow control valves 25 are illustrated symbolically rather than in detail. Lockhopper 30 preferably also contains auxiliary inlet 34 in flow communication with lockhopper bin 33. Within auxiliary inlet there is auxiliary pressurizing fluid inlet valve 35 which is also illustrated symbolically. Auxiliary inlet 34 is connected to a source (not shown) of pressurizing fluid.

The operation of the lockhopper of this invention will now be described with reference to the FIG. 4 embodiment. To best understand the operation of the lockhopper of this invention, assume that lockhopper 30 is initially empty and must be filled with particulate solid material 40 and then pressurized. To perform that operation valve arrangement 20 in outgoing means 44 would be closed. Then fluid flow control valve 25 in incoming means 43 would be opened, particulate solid flow control valve 10 within incoming means 43 would be opened and solid particle material 40 would be allowed to flow into the hopper bin 33 until it was essentially completely filled or filled to any other desired level. At that point, first the solid particle valve 10 in incoming means 43 would be closed to prevent further entry of solid particles 40, and then fluid flow control valve 25 in incoming means 43 would be closed to cut off fluid flow. If the material supplied to the lockhopper were pressurized, then the fluid flowing with the solid particles would also pressurize the hopper bin and this vessel itself would be pressurized at that condition. If not, the vessel 33 could be pressurized with another fluid through auxiliary inlet 34 and auxiliary pressurizing fluid inlet valve 35. In any event, once the vessel is pressurized, it can then be emptied of the solid by first opening fluid flow control valve 25 in outgoing means 44 and then opening particulate solid flow control valve 10 in outgoing means 44 to allow flow of the particulate solid out from the vessel 33. Alternatively, it could be that the vessel 33 would be pressurized from a process vessel associated with the process through outgoing means 44. To affect that change, fluid flow control valve 25 in outgoing means 44 could be opened first and fluid would be able to flow upward through means 44 and through solid particle valve 10 to pressurize vessel 33. Once the vessel is pressurized, valve 10 in outgoing means 44 could then be opened to allow flow of particulate solids from vessel 33. The exact sequence of valve operation would depend on the process requirements and process fluid availability. However, any arrangement would result in the segregation of solid particles from fluid flow control valves 25 while those valves were being cycled to either open or close the associated valve arrangement 20. As a result, these fluid flow control valves could operate through many cycles without the adverse impact of particle abrasion and valve surface erosion. As can be seen, particle level is always retained above the solid particle valve 10 and thereby maintained separate from fluid valves 25. It should be noted that lockhopper arrangements such as 30 could be combined with an accumulator vessel connected to incoming means 43 and above the lockhopper vessel such that the flow of fluid and of solid particles can be continuous through a processing step of a process arrangement such as a separation associated with moving bed systems. In this way, while the lockhopper pressure level was being cycled, the solid particles would simply accumulate in the accumulator or storage vessel and would then be available to be transferred to lockhopper 30. Such an arrangement essentially allows a moving bed absorption system to be continuous in its processing steps although the lockhopper steps are in effect batch processes.

Although the particulate solid flow control valve and method, the particulate solid and fluid flow control valve arrangement and method, and the lockhopper, of this invention have been described with reference to specific preferred embodiments, those skilled in the art will recognize that there are other embodiments of this invention within the spirit and scope of the claims.

We claim:

1. A method for controlling the flow of particulate solid material and fluid material enabling reduction in valve wear and in particle abrasion and breakdown comprising: passing particulate solid material and fluid material into an enclosure through an essentially vertically oriented inlet conduit having a downward directed opening; positioning within the enclosure a surface structure beneath and vertically spaced from said inlet conduit opening; piling particulate solid material passing through the inlet opening into the surface structure in a roughly conical pile having an angle of repose sufficient to enable the pile to completely block the inlet opening; opening a fluid flow control valve in an outlet conduit; thereafter removing the surface structure from the defined position beneath the downward directed opening; passing particulate solid material out from the enclosure through said open valve; and closing the valve in the outlet conduit after the flow of particulate solid material through the valve has ceased, whereby pressure contact between particulate solid material and valve surfaces is avoided.

2. The method of claim 1 wherein said particulate solid material is adsorbent.

3. The method of claim 1 wherein fluid is passed into the enclosure through means other than the inlet conduit.

4. A lockhopper comprising a hopper bin having incoming and outgoing means, said incoming and outgoing means each having a valve arrangement for controlling the flow of particulate solid material and fluid material enabling reduction in valve wear and in particle abrasion and breakdown, each said valve arrangement comprising: an enclosure having an inlet conduit and an outlet conduit; said inlet conduit being essentially vertically oriented and having a downward directed opening for flow of particulate solid material and fluid material into the enclosure; a surface structure positionable within the enclosure beneath and vertically spaced from said conduit opening and essentially perpendicular to said conduit having a surface which is greater than the conduit opening cross-section projectable thereon when so positioned; and said outlet conduit having a valve therein suitable for controlling the flow of fluid material.

5. The lockhopper of claim 4 further comprising a valved auxiliary inlet in flow communication with the hopper bin and with a source of pressurizing fluid.

6. The lockhopper of claim 4 wherein at least one of said inlet conduits has a circular cross-section.

7. The lockhopper of claim 4 wherein at least one of said surface structures is flat.

8. The lockhopper of claim 4 wherein at least one of said surface structures is curved.

9. The lockhopper of claim 4 wherein at least one of said surface structures is positionable by means of a push-pull piston.

10. The lockhopper of claim 4 wherein the surface area of at least one of said surface structures exceeds the area of the projectable cross-section by at least 10 percent.

11. The lockhopper of claim 4 wherein the surface area of at least one of said surface structures exceeds the area of the projectable cross-section by at least 25 percent.

12. The lockhopper of claim 4 wherein at least one of said fluid flow control valves is of the type from the group comprising gate valves, ball valves, globe valves, and butterfly valves.

* * * * *

UNITED STATES PATENT AND TRADEMARK OFFICE
CERTIFICATE OF CORRECTION

PATENT NO. : 4,627,456
DATED : December 9, 1986
INVENTOR(S) : W.E. BeVier et al

It is certified that error appears in the above-identified patent and that said Letters Patent is hereby corrected as shown below:

In column 4, line 32 delete "when" and insert therefor --then--.

In claim 1, line 10 delete "into" and insert therefor --onto--.

Signed and Sealed this

Seventh Day of April, 1987

*Attest:*

DONALD J. QUIGG

*Attesting Officer*  *Commissioner of Patents and Trademarks*